United States Patent [19]

Korinek et al.

[11] Patent Number: 5,225,292
[45] Date of Patent: Jul. 6, 1993

[54] INTERNALLY FOLDED EXPANDED METAL ELECTRODE FOR BATTERY CONSTRUCTION

[75] Inventors: Paul D. Korinek, West Bend; Maurice C. Morgan, Belgium; Doug C. Pierce, Mequon, all of Wis.

[73] Assignee: Globe-Union Inc., Milwaukee, Wis.

[21] Appl. No.: 821,080

[22] Filed: Jan. 16, 1992

[51] Int. Cl.$^5$ .................. H01M 4/66; H01M 4/74; H01M 10/18; H01M 2/12

[52] U.S. Cl. .................................. 429/82; 429/163; 429/210; 429/234; 429/242; 429/245; 429/246

[58] Field of Search ............... 429/243, 246, 234, 245, 429/72, 82, 210, 163

[56] References Cited

U.S. PATENT DOCUMENTS 3,723,181  3/1973  Oakley .
4,048,397  9/1977  Rothbauer .
4,353,969 10/1982  Rippel et al. .
4,761,352  8/1988  Bakos et al. .
4,830,938  5/1989  McCullough et al. .
5,017,446  5/1991  Reichman et al. .

OTHER PUBLICATIONS

Air Force Interim Report for Period Jan. 1988–Dec. 1988 Alan Attia, Wright–Patterson Air Force Base, Ohio 45433–6563.

Primary Examiner—John S. Maples
Attorney, Agent, or Firm—Foley & Lardner

[57] ABSTRACT

A battery system is disclosed which includes folded grids of expanded metal inserted through non-conductive substrates and pasted with electrochemically active materials. In the most preferred embodiment, a frame is provided with a plastic insert, and slots are provided in the latter to receive the expanded metal grid. After suitable coinage of the grid and insertion through the plastic film, the grid is sealed and pasted on opposite sides with positive and negative active material. A battery is assembled using one or a plurality of the resulting electrode elements, with separators, to produce a high-power, lead-acid battery. The folded grid provides many of the design benefits of standard bipolar construction.

22 Claims, 6 Drawing Sheets

INTERNALLY FOLDED EXPANDED METAL ELECTRODE FOR BATTERY CONSTRUCTION

The invention described herein was made in the performance of work under NASA Contract No. NAS7-918, JPL Subcontract No. 958Z99 and is subject to the provisions of Section 305 of the National Aeronautics and Space Act of 1958 (42 U.S.C. 2457).

BACKGROUND OF THE INVENTION

1. Field of the Invention

The present invention relates generally to the art of batteries and more particularly to sealed, high-power lead-acid batteries of a modified bipolar nature. Still more specifically, in the most preferred embodiment, the invention relates to a battery which includes a expanded metal grid inserted through slots in a non-conductive film and folded therearound prior to pasting to form individual quasi bipolar battery elements.

2. Description of the Prior Art

Bipolar batteries have been known for many years and typically include an electrode pair constructed such that positive and negative active materials are disposed on opposite sides of an electronically conductive plate. Batteries prepared from bipolar electrodes typically comprise a series arrangement of the electrodes, with separate elements for the terminal electrodes, which are typically monopolar in nature.

Several advantages of bipolar electrodes are noted when they are compared to monopolar batteries, the latter being typified by automotive batteries. In monopolar systems, electrodes of like polarity are usually connected by means of a lead lug, with monopolar cells connected in series using intercell welds. In an ideal bipolar configuration, the cell-to-cell discharge path is comparatively shorter and dispersed over a larger cross-sectional area, thus reducing the ohmic resistance and improving power capabilities. Moreover, operating voltages of bipolar batteries should be considerably higher due to the lower resistance, providing the capability of producing high voltage batteries in relatively small, light-weight packages.

Lead-acid batteries are attractive candidates for bipolar construction because of the high power capabilities known chemistry, excellent thermal characteristics, safe operation and widespread use. The key component, however, in the development of lead-acid bipolar batteries has been the bipolar substrate construction. That element must be non-porous and must be able to withstand the corrosive environment within the lead-acid battery enclosure.

Numerous prior bipolar systems have involved the use of a variety of substrate materials, including conductive oxides dispersed in resin binders, high surface area conductive carbons dispersed in binders, and combinations of the foregoing. The problems of constructing suitable substrates using particles dispersed in a binder include properly wetting the conductive material, achieving proper sheet formation and sealing of this sheet in a battery environment. Fillers must be suitably conductive, must exhibit no porosity when dissolved in a carrier, must have low solubility, and must be stable at the lead and lead oxide electrode potentials which exist on the opposites sides of the substrate. The filler materials also cannot act as catalysts for oxygen or hydrogen evolution in these sealed battery environments.

Lead substrates have been used in bipolar designs, but are not particularly useful because of the weight of the substrate when compared to filled resin substrates. Further discussion of efforts to develop bipolar substrates can be found in U.S. Pat. No. 5,017,446, issued May 21, 1991 to Reichman et. al for "Electrodes Containing Conductive Metal Oxides", and U.S. Pat. No. 4,173,362, issued Dec. 22, 1992 by Tekkanat et. al and entitled "Composite Substrate for Bipolar Electrodes."

Several batteries which are quasi-bipolar in nature are described in earlier patents. In Oakley, U.S. Pat. No. 3,723,181, issued Mar. 27, 1973 for "Duplex Electrode Construction Using Continuous Electrically Non-Conductive Carrier Strip", the electrode is constructed on an electrically non-conductive carrier strip provided with holes and a conductive material is provided on both sides of the strip and is electrically connected through the holes. Positive and negative electrode deposits are made over the conductive material on both sides of the carrier strip.

In Rippel, et al., U.S. Pat. No. 4,353,969, issued Oct. 12, 1982 for "Quasi-Bipolar Battery Construction and Method of Fabricating", lightweight batteries include continuous strips of thermoplastic material and a plurality of electrically isolated lead strip arrays about which the strips are folded to provide pleated bipolar plates. The strips are sealed along their edges for receiving separator plates and so that electrolyte may be maintained within the cells. The active material for the battery is carried in scrim fabric and the entire assembly is held under compression by exterior resilient means.

A "Secondary Battery" is described in McCullough, et al., U.S. Pat. No. 4,830,938, issued May 16, 1989, and includes a series of cells defined by electrodes having a body length sufficient to be inserted through an insulating wall into adjacent cells, the electrode extending from the bottom of one cell, through the insulator at a location near the top of the electrode and into the next cell. The electrodes are electrically conductive carbonaceous material having defined properties which act as energy storing material.

In U.S. Pat. No. 4,048,397, issued Sep. 13, 1977, Rothbauer describes a "Method and Apparatus for Interconnecting Stacked Electrodes of Batteries." In this device, the batteries are interconnected by means of a pair of conductive bands insulated from one another and bent into a zig-zag formation. Each band overlays an electrode of one polarity, thus performing the function of a separator as well as a terminal conductor. In the disclosed embodiment, the conductive strips are made from a material such as stainless steel.

Another battery system which includes folds in certain of the components is described in U.S. Pat. No. 4,761,352, issued Aug. 2, 1988 to Bakos, et al. for "Accordion Folded Electrode Assembly." In this device, the anode, cathode and separator are laminated together in an accordion fold to form electrochemical cells. The folding is carried out to eliminate manufacturing steps involving the insertion of plates into pleats of a zig-zag anode and the need to make series electrical connections between individual cathode plates.

All of the foregoing systems suffer one or more sealing, fabrication or performance drawbacks. Furthermore, those systems which involve the folding of electro-active material over an insulating separator may suffer corrosion problems and they involve lengthy current collection flow paths and increased ohmic resistance. A need exists in the art for a high-power battery having low internal resistance, large active areas, low volume and weight, long life cycles and reduced failure mechanisms. The need is compounded by the failure of the art to successfully overcome existing and well documented problems with bipolar systems, including primarily the development of suitable substrates.

SUMMARY OF THE INVENTION

The present invention features a quasi-bipolar battery element which overcomes numerous disadvantages of prior art devices. The invention features a battery element which is capable of being combined with other elements to form high-power, lead-acid batteries having high voltage and current output. The invention also features a battery element which achieves numerous bipolar benefits without using a conductive bipolar substrate. The invention further features battery elements for which the current flow path is short, while retaining large surface areas for the active battery material. The invention also features battery elements which can be constructed in a variety of shapes and combined in a variety of series and parallel arrangements to provide batteries having widely varying power and application characteristics.

How the present invention, especially the illustrated form thereof, provides the features set forth above, and numerous other features which will appear to those skilled in the art after reading the present specification, will become apparent in the detailed description which follows, taken in conjunction with the FIGURES. Generally, however, the features are achieved by employing a battery element which includes a frame supporting a non-conductive sheet which includes one or more slots therein. The grid for the battery of the preferred form of the present invention includes an expanded metal, lead grid which is folded and passed through the slots so that a portion of the grid lays against opposite faces of the sheet. The slot and fold area is sealed to prevent leakage from one side of the sheet to another during use of the element, and the grids are pasted with active materials, which may be conventional in and of themselves. The electrodes are combined, with appropriate separators, terminal plates, and battery casings to provide a completed battery. Addition of electrolyte and formation then takes place, and vents are provided for each cell to prevent the build-up of dangerously high pressures within the cells. The current flow path may be decreased by expanding the number of slots and the number of grids for a given size electrode. Other ways in which the present invention allows the features described above to be achieved are deemed to fall within the scope of the invention if they fall within the scope of the claims which are appended hereto.

DESCRIPTION OF THE DRAWINGS

FIGURE IA is a sectional view of the frame of FIG. 1 taken along the line A—A thereof.

FIGURE IB is a sectional view of the frame of FIG. 1 taken along the line B—B thereof.

In the drawings, like reference numerals are used to indicate like components.

DETAILED DESCRIPTION OF THE PREFERRED EMBODIMENT

Before proceeding to the description of the FIGURES, details of the preferred embodiment of the present invention and its method of fabrication, it will be useful to provide general comments about the applicability and adaptability of the present invention. First, while in the FIGURES a two-component frame and film element is used to support the folded grid, a unitary component, made by injection molding or other techniques could be employed. The disclosed embodiment shows the two components because we have found it to be superior from a manufacturing and from a reliability standpoint.

Second, while the present invention is illustrated as including an expanded metal grid, namely an expanded lead grid, other materials known to provide support for battery paste materials may be used in the present invention. For example, numerous lead alloys and other metals and alloys are well known in the lead-acid battery art, and they could be employed in the present invention.

Third, the electrode elements of the present invention are prepared by employing two folded, coined expanded lead grids, yielding four separate flow paths, as will become apparent shortly. A greater number of grids could be used for the size of frame which will be illustrated, or a single, folded grid could be used. The more folds for the same plate area, the greater the number of distinct flow paths, each having a shorter pathway, resulting in reduced ohmic resistance.

Fourth, the paste materials which are useful in the present invention for the positive and negative sides of the electrodes can be selected from any conventional lead-acid pastes. Any known lead-acid paste materials could be substituted, including doped systems.

Fifth, while square electrode elements are shown, they could be rectangular or of other shape and the number of them could vary widely. The 20 cell battery of the illustrated embodiment is only illustrative, and the number of cells could be as little as 2 and could certainly be expanded well beyond 20. Moreover, a single battery cell stack is illustrated and it will be apparent to those skilled in the art that the cell packs could be combined with other cell packs in series, or in parallel, to provide a wide variety of high-power batteries.

Finally, numerous of the components used in constructing the preferred embodiment of the present invention, and numerous of the manufacturing steps which will be described in detail, could be varied without departing from the scope of the present invention. Many of the manufacturing techniques are those which, as of the time of the filing of the application, are believed to result in optimum manufacturing efficiency and which lead to minimum failure rates. Where less stringency is required, some of the elements could be reduced in complexity, as will become apparent to those skilled in the battery manufacturing art after reading the present specification. Examples of manufacturing techniques which could be varied include the disclosed IR welding techniques and the systems for securing the grid to the substrate. Various chemical treatments are also included, and substitutions could be made for them as is known to those familiar with this art.

A description of the preferred embodiment of the present invention is best provided by following the manufacturing techniques from the selection of component materials to their individual fabrication and combination first into an electrode element and then into a battery system.

Figure 1:
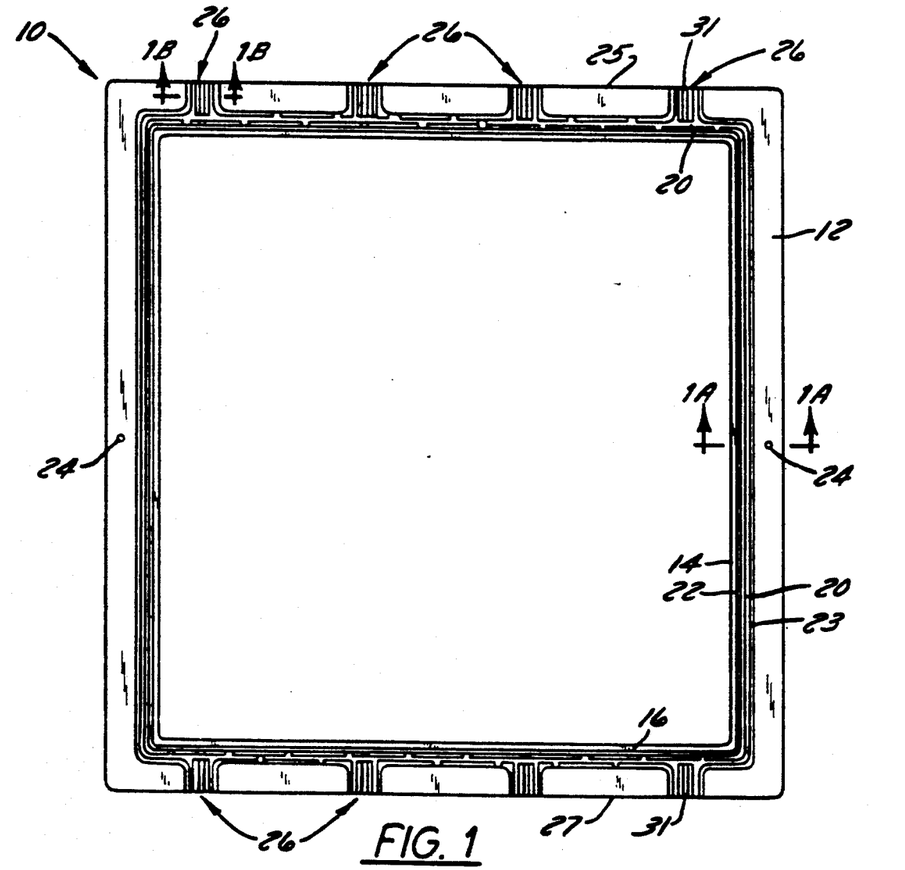
FIG. 1 is a front elevational view of a frame used to contain battery elements according to the preferred embodiment of the present invention.
Figure 1A:
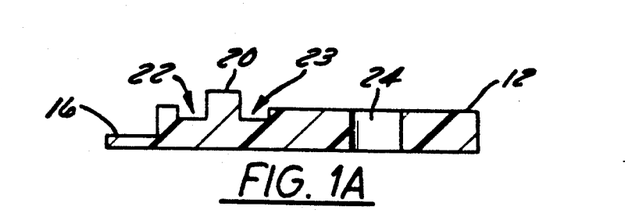
Figure 1B:
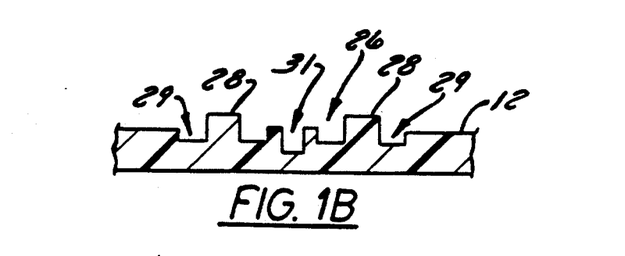

The fabrication begins with the preparation of a frame 10 illustrated in FIG. 1. Frame 10 is preferably formed by a molding process (e.g., injection molding) from a thermoplastic resin suitable for use in the harsh environments encountered in lead-acid batteries. Polyolefins are appropriate, such as polyethylene or polypropylene, with high density polyethylene reinforced with about 30% glass fibers being used in our most recent work. Frame 10 may be made in various sizes, but to give the reader some idea of one preferred construction, frame 10 is square and has sides of about 12 inches.

Frame 10, as the name implies, includes a border 12 surrounding a square opening 14. The thickness of frame 10 is about 0.10" and the width of the border is about 0.90" in the illustrated embodiment. Frame 10 includes several other features including an inwardly directed lip 16 surrounding opening 14 and extending from the rear of frame 10 as it is viewed in this FIGURE. Moreover, a first raised bead 20 extends outwardly from the front surface of frame 10 and totally surrounds the opening 14 at a location outwardly of, but generally near lip 16. A pair of recesses 22 and 23 are located on either side of bead 20. They similarly extend around the border 12 of frame 10.

A hole 24 is shown in the FIGURE at approximately the middle of each side of border 12, located between recess 23 and the outer edge of border 12. Furthermore, four channel moldings 26 are formed on each of two opposing sides (25 and 27) of frame 10 by a pair of parallel beads 28 having a height coextensive with that of bead 20. Grooves 29 are formed in the border 12 on both sides of beads 28 and extending from the outer edge of border 12 toward opening 14, but the grooves 29 do not interrupt the integrity of bead 20. A channel 31 is formed between and generally parallel to beads 28, channel 31 having a depth greater than grooves 29. Channel 31 extends from the outside of border 12 but also does not pass through bead 20.

A brief comment at this point in the description of the fabrication process will assist in the understanding of not only frame 10, but the remainder of the components.

Each frame 10 will be a building block for a battery electrode, with a film (soon to be described) joined to lip 16, and with battery grid and active materials in turn secured to the film. The frames 10, a selected number of which will be used for a particular application, will be joined to one another in a front-to-back relationship (shown in later FIGURES) so that the bead 20 and the beads 28 of one frame 10 will attach to the generally planar rear surface of the next frame. The bead height, as well as the thickness of the frames, will therefore define individual cells for containing electrode, electrolyte and separator components. It should also be pointed out that one of the channels 31 will eventually be used as a passageway and be coupled to a filler tube to permit addition and removal of electrolyte from the cells during battery formation and to receive a vent to prevent gas ingress and to permit release of excessive gas pressure from within the cells. It will, of course, not be necessary or desirable to use all of the channels 31 which could be used (eight in the FIGURES), but it may be desirable in a cell stack to vary the location of the opened channel from one cell to the next. This is why four channels are provided in a spaced apart pattern across the sides 25 and 27 of frame 10.

Figure 2:
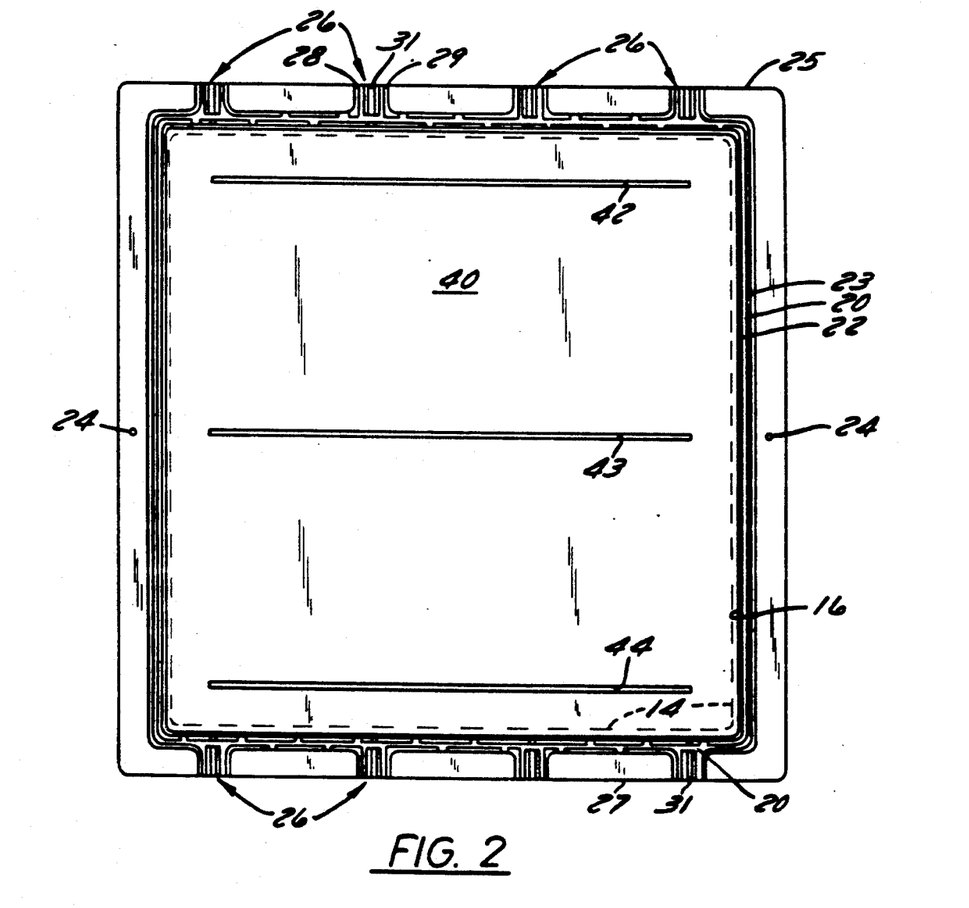
FIG. 2 is a front elevational view of the frame shown in FIG. 1 with a film substrate contained therein, the film having been die cut to receive the folded grid elements of the present invention.

Proceeding now to the description of FIG. 2, it can be seen that a film substrate 40 has been inserted into frame 10. Substrate 40 can also be made from glassed-filled high density polyethylene (or the other materials referred to above for use in constructing frame 10), with the preferred material being 15% glass filled HDPE and having a thickness of about 0.020". It can also be seen in FIG. 2 that three parallel slots 42-44 are cut through substrate 40, one near side 25, one in the middle of the substrate 40 and one adjacent to the opposite side 27. The slots have a width of about 0.60" and, as will be explained below, are arranged to receive folded battery grids. The present invention encompasses using only a single slot adjacent one side with a single fold of grid material, or more than three slots for some applications. The number of slots will determine the current pathway as will be apparent to those skilled in the art. The substrate 40 is connected to frame 10 in the most preferred embodiment using a heat welding technique, such as IR welding. The substrate 40 is sized to overlay lip 16 and to be received within frame 10. Masking tape or any other type of adhesive can be used to maintain the substrate 40 in a proper fixed location during welding.

As previously mentioned, frame 10 and substrate 40 could be formed as a single component, but we have determined the above-described two-component fabrication technique is most suitable. Some attempts to form the components in a unitary fashion resulted in leakage and failure, possibly due to the different cooling rates of components having different thicknesses, (i.e. the substrate area versus the frame area). Moreover, use of the above-described fabrication technique allows for the selection of different materials for frame 10 and substrate 40, which may provide cost or other benefits.

The grids 50 (shown first in FIG. 3) to be added to the structure shown in FIG. 2 will now be described. As previously mentioned, they are preferably lead grids and are most preferably expanded lead grids. Two suitable materials are available from Delker Corporation of Branford, Conn., Type #416 with 6.67Xlength extension and 85% open area or Type #284 with 3.33Xlength extension and 70% open area.

Prior to adding the grids to the substrate, the grid material is cut to the approximate length from the roll on which it is provided by the supplier. The material is then placed in a coining press to create the desired thickness of the expanded metal which will eventually receive the positive and negative active paste materials. While a single thickness could be used, our work has indicated that a different thickness for the positive and negative sides yields improved results. Accordingly, in the preferred embodiment, the area of grid 50 which will receive positive paste material is coined to a thickness of about 0.035", while the area which is to receive negative paste material is coined to about 0.020". Both dimensions could be varied depending on battery size. For our preferred embodiment, we used about 42 grams of the #416 material and the coining press was a 100 ton press, with coining time of about 15 seconds.

Figure 3:
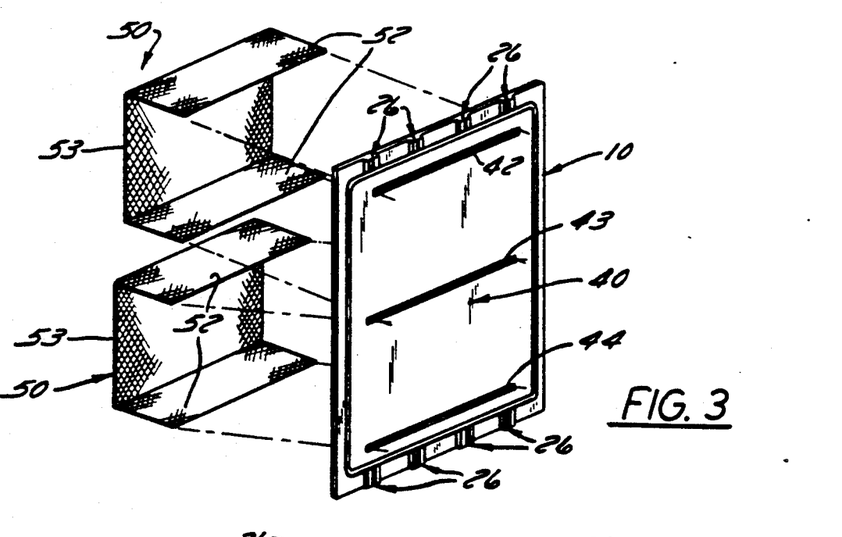
FIG. 3 is a schematic view of the frame and substrate element of FIG. 2 receiving two folded grids.

Grids 50 are folded as shown in FIG. 3, it being appreciated now that the positive paste receiving area will be the folded flaps 52, while the negative paste receiving area will be the planar area 53 (or vice versa for both). The grids 50 are preferably cleaned during this phase of the process (e.g. in a 1,1,1-trichloroethane solution) and dried, following which the area of the folds are coated with a film of a wood resin based material (which can be dissolved in 1,1,1-TCE) to act as a corrosion inhibitor.

Figure 4:
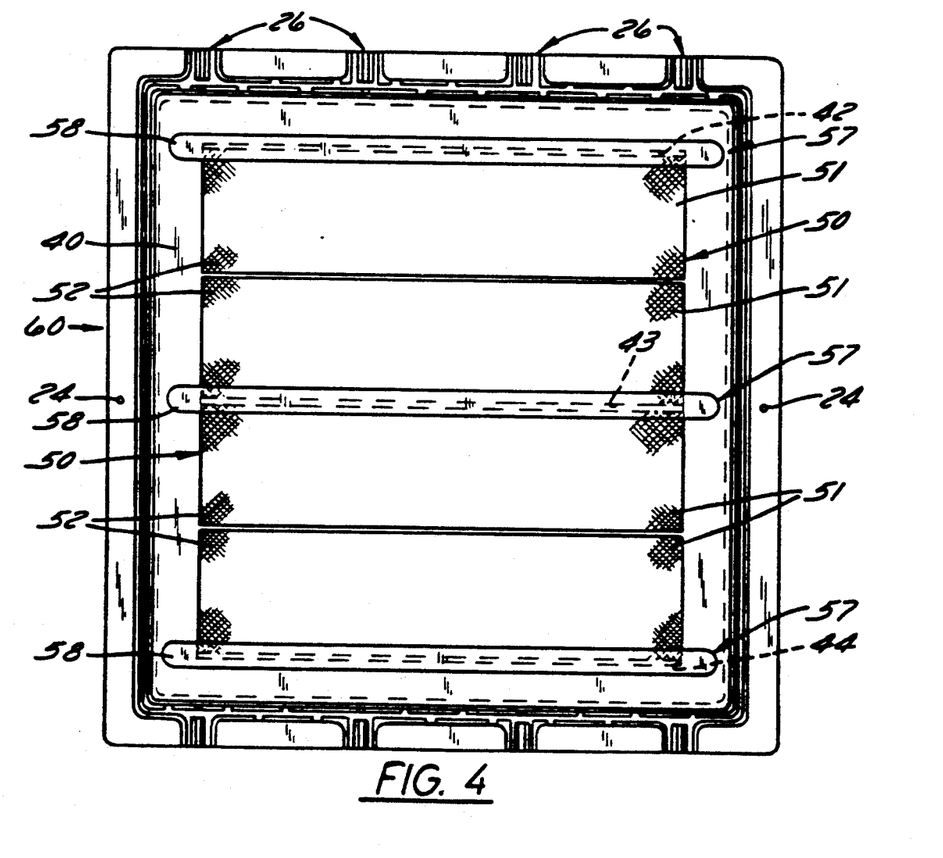
FIG. 4 is a front elevational view of the frame, sheet, grid and sealing components used in the preferred embodiment of the present invention, the elements being shown in an unpasted condition.

Referring next to FIG. 4, a front elevational view, the grid flaps 52 are shown folded into contact with the front surface of substrate 40. Moreover, the area 53 on the reversed side of substrate 40 is slit across its width, in each instance at a location opposite to that of the adjoining edges of flaps 52. The result, using the three slot substrate and two folded grids 50 is the creation of four individual grid elements 51 having a flap 52 on one side of the substrate and a newly created flap on the opposite side of the substrate 40. Again, it should be pointed out that the number of slots, and hence the number of folded electrodes 51 for a given element can vary from that shown in the illustrated embodiment. Any suitable shearing device, such as a knife or scissors, can be used to form the rear flaps from the initial planar areas 53.

The next step in the fabrication process of the preferred embodiment of the present invention is the sealing of the fold/slot area 57. This is preferably accomplished using a thermal welding technique, such as IR welding, after the flaps have been adhered on the proper location on substrate 40, e.g., by the use of several drops of a hot melted adhesive or by the use of a sheet of double-sided adhesive tape.

The sealing material itself can be narrow strips 58 of the same material from which the substrate was initially prepared having a width of, for example, 0.030". Typically, the strip 58 would be tacked on each end using a hot tool such as a soldering iron, following which the IR welder causes the strip 58 to melt down into the grid and seal the slots 42-44 on one side. The same procedure is employed on the opposite side of the substrate, following which leak testing is performed using known techniques to insure adequate sealing of each grid. A nitrogen tester in a bubble chamber is one suitable technique for performing such testing. The test fixture should be set to at least five PSI and the electrode should produce zero bubbling after 60 seconds. Leaks which are noted can be repaired using the welding or melting techniques previously described.

Figure 5:
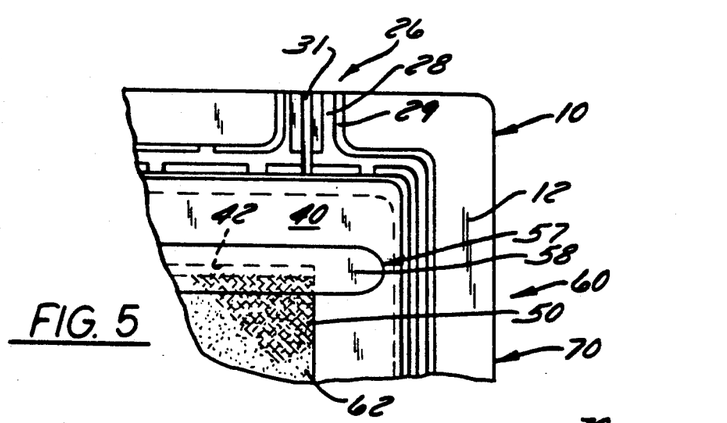
FIG. 5 is a partial sectional view of the components shown in FIG. 4, but showing the grid in a pasted condition and showing an electrolyte channel formed in the frame.

Dealing next with FIG. 5, a partial view of an upper corner of the electrode 60 (comprising the frame 10, substrate 40 and sealed grids 50) with paste material 62 applied thereto. It should also be noted in this figure that a channel 31 has been opened (for example, by using a hot needle or wire). Following the fabrication techniques discussed in connection with the previous FIGURE, the elements 60 are prepared for pasting by final cleaning steps which can include washing with water and if necessary light scrubbing with a small brush. A rinse in 1,1,1,-TCE is followed by complete drying. Using a masking tape, such as drafting tape, both sides of element 60 are masked to define the area which is to receive the pastes. It is desirable to mask the electrodes to achieve the desired thickness of the paste and to keep the paste only on predefined areas, so that the target weight of paste can be more exactly applied. Moreover, the tape keeps the areas which will subsequently be welded together as clean as possible and reduces the amount of electrode clean-up which is required prior to final assembly.

The paste is applied using any known pasting technique. Rolling of the paste using a rubber roller ensures good penetration of the paste into the open areas of the expanded grid. Following pasting of the positive side, the electrode is cured, and the process is repeated on the opposite side. The masking materials are then completely removed leaving pasted electrode elements 70 ready for assembly into a battery stack. Note in FIGURE 5 that the channel 31 which has been opened is the one at the upper, right-hand corner in this view. As previously mentioned, in the illustrated embodiment, it will be desirable to have selected ones of the other three channels opened in subsequent electrode fabrication, so that when assembled into a stack, pasted electrodes 70 will have a sequential arrangement of channel openings.

Figure 6:
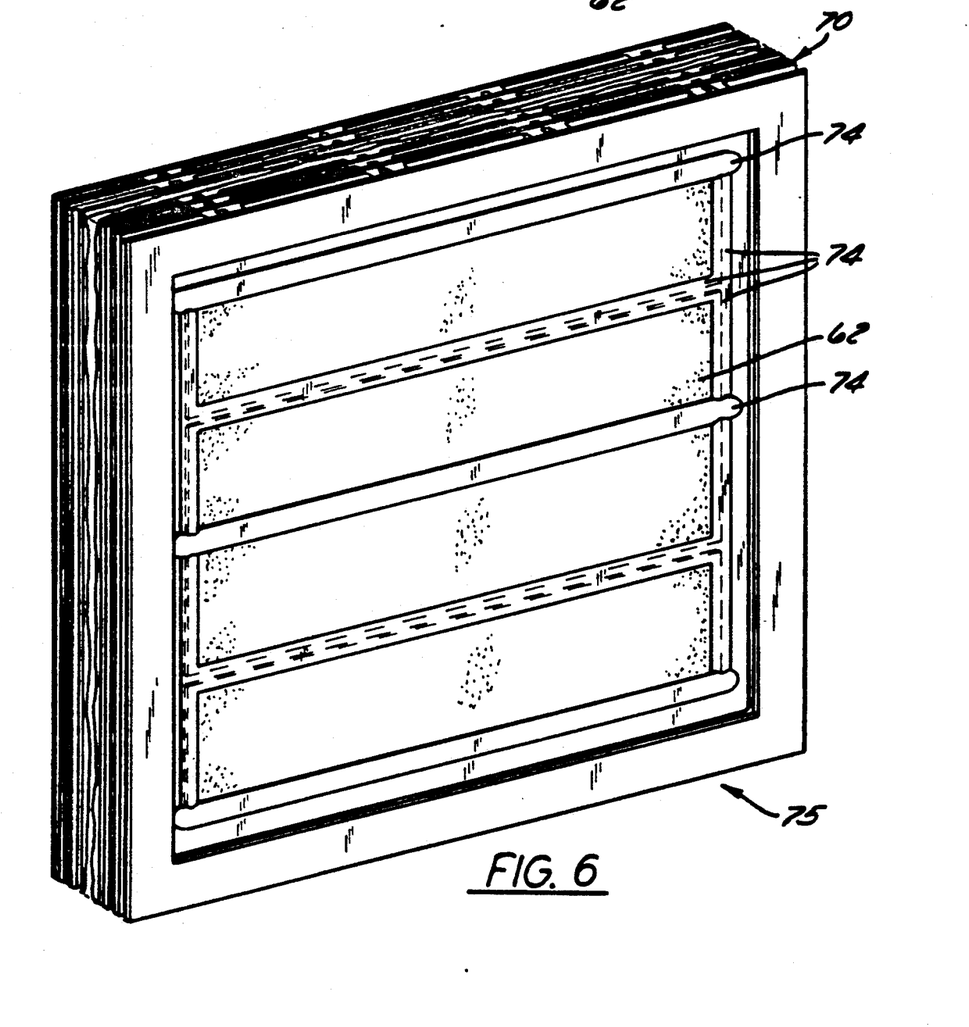
FIG. 6 is a perspective view of a stack of 20 of the electrode elements assembled in face-to-face relationship.

FIG. 6 is a perspective view of a plate stack 75 which includes 20 of elements 70 connected together in a manner which will be described shortly. As shown in FIG. 6, the cell stack is still square. The stack 75 is prepared by first making sure that all grids of the electrode elements 70 are flat and that no rough edges of the expanded metal extend angularly to the substrate which could result in shorting of the electrodes. We have found that application of thin strips of material 74 across the areas previously defined by the slots 42-44 and around the periphery of the grids and over the abutting edges of the flaps will assist in preventing such failures. We have used CELGARD 3501 which is supplied by Hoechst Celanese Corporation for this purpose. It should also be appreciated that separator sheets 76 (shown in subsequent FIGURES), will be disposed between adjoining positive and negative faces in the cell stack. The selection of the separator material can be from those used in the lead-acid battery art, but we prefer to use absorptive glass mat separators such as Hovosorb 2 BG-14017 sold by Hollingsworth and Vose Company. This separator material has a surface area of approximately one square meter per gram and includes approximately 5% hydrophobic filler such as polypropylene. The separator sheets should be sufficiently large to cover all paste areas and yet not interfere with the welding which will take place using beads 20 and 28.

The stacking procedure is started, in our preferred fabrication technique, by placing one electrode 70 in a fixture which will ensure proper alignment of the electrodes 70 as they are added into stack 75. Between the first electrode and the second, a separator sheet is added and tacked in place, for example using several small drops of hot melt adhesive. We prefer to construct the cell stack 75 using vibration welding which will cause beads 20 to fuse to the planar, rear sides of frame 10 with melted material flowing into the flash channels 22 and 23 which exist next to beads 20. The procedure is continued by welding additional electrodes 70 onto the stack until the desired number has been reached.

Figure 7:
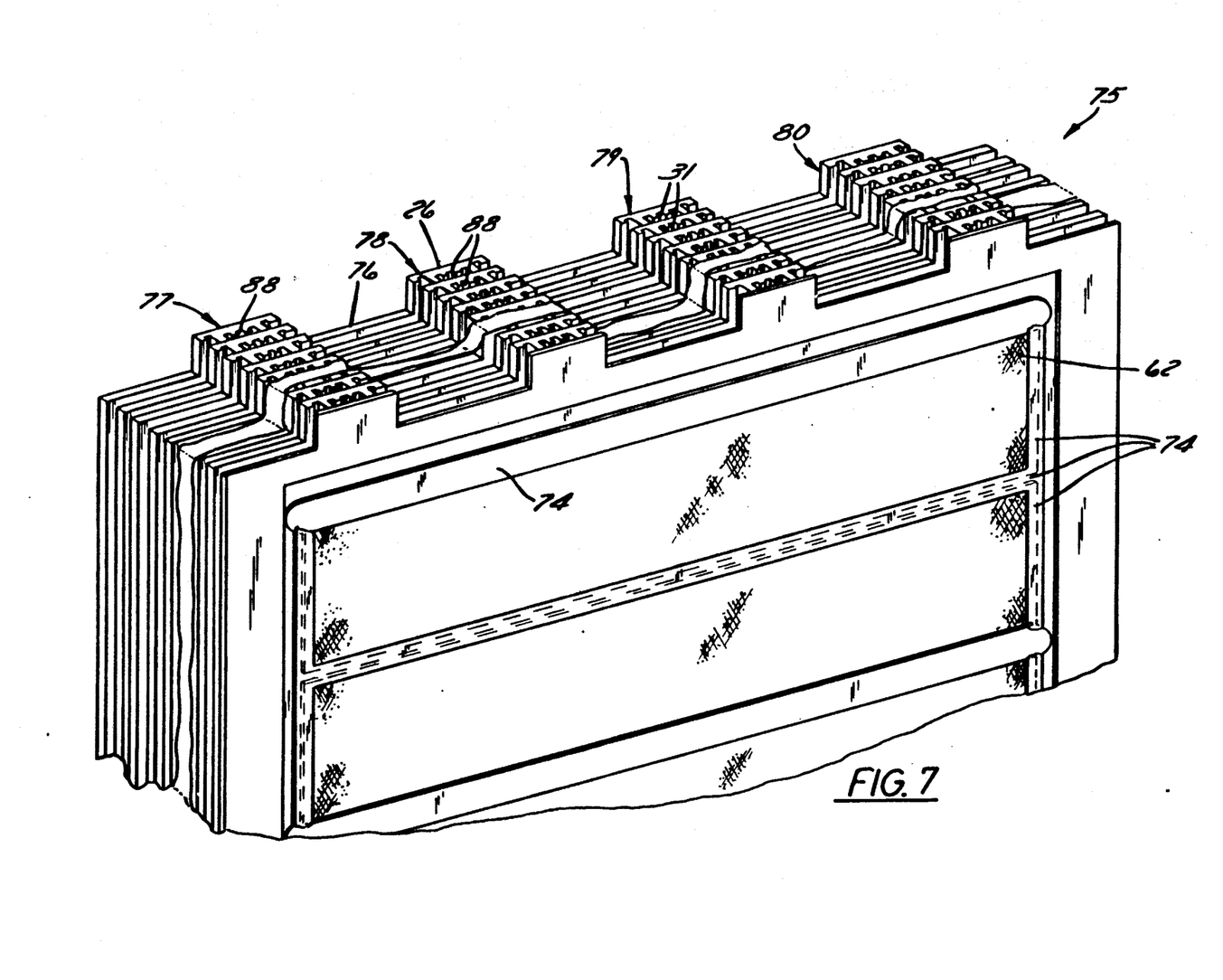
FIG. 7 is a perspective view of the upper portion of the element stack shown in FIG. 7, and illustrating the elimination of frame material to prepare the filling and vent holes.

FIG. 7 is a perspective view of the upper portion of the element stack 75 shown in FIG. 6 and illustrating the preparation of the acid flow ports. It will be noted in this figure that a square cavity 76 has been milled around the area of channel moldings 26 using normal plastic milling equipment, the stack 75 being held in position by clamping devices. It should also be noted that four separate rows of frame material 77–80 are left along the top, each of the rows including five of the open channels 31 previously discussed. This is accomplished during the cell stacking and vibration welding procedures by selecting appropriate elements 70 having the desired open channel location. This particular arrangement is beneficial because it provides additional room for the acid flow fill ports and the vent devices which will be described later, i.e. five in each row, rather than having to arrange 20 of the devices in a smaller amount of space.

Obviously, the initial design of frame 10 could be varied to provide five channels, or any other arrangement might be used which would appear to one skilled in the art after reading the present specification. The channels 31 are cleared using a small drill bit, for example, and a vacuum may be applied to ensure that there is no internal contamination of the cells formed between adjacent elements 70. Each of 20 flow ports 88 are then provided with a fitting 89 which is secured in place, for example, using an epoxy resin. The fittings 89 are simple plastic tubes, tapered somewhat to be received within the flow ports 88 provided above each open channel 31. An epoxy resin which can be used is H. B. Fuller UR/2139 A/B. A wood resin coating, such as the one previously described and available from Wedor Chemical Co., Inc., can be also used as a corrosion inhibitor.

Figure 8:
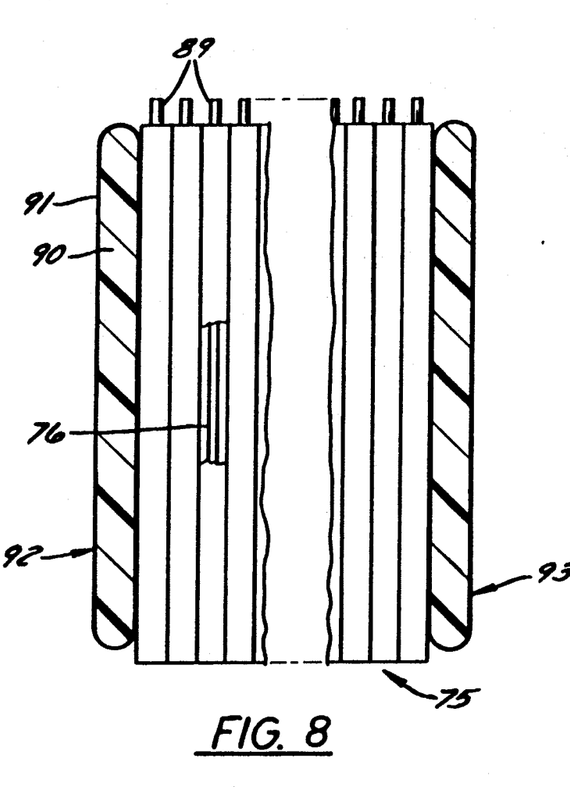
FIG. 8 is a schematic illustration of an element stack with termination components.

The next step in the manufacturing process is the application of terminations, as illustrated in FIG. 8. The illustrated terminations include compressible sheets 90, such as Pres-Bond polyethylene foam, PF618, supplied by Spec Tapes, Inc., Milwaukee, Wisconsin. This material includes an adhesive backing on both sides and is surrounded by a thin copper sheet 91 which may have a thickness of about 0.005". The copper sheeting 91 is cut to a size which would permit it to be wrapped around both faces of the compressible pad 90. The positive and negative terminals 92 and 93 should be sized to cover entirely the area defined by the paste on the terminal electrodes in the cell stack 75. It may also be desirable to enhance electrical contact between the terminal electrodes and the terminations 92–93 by using a conductive grease (not shown) such as Conducto-Lube silver based lubricant available from Cool-Amp Conducto-Lube Company of Portland, Oreg. This material is smeared in a thin coating over the terminations 92–93 and is smoothed into conductive contact with the electrode stack 75 prior to formation and eventual encasement of the battery. After formation, vents 94 are added. Umbrella type vents which fit within the fittings 89 are entirely suitable, as are other types of vents which would prevent an ingress of an into the cells of the finished battery and which would permit escape of gases formed during storage or use of the finished battery when the pressures thereof reach undesirable levels, e.g. above 2 psi. The vents 94 are secured in place after electrolyte addition and battery formation, e.g. with the same epoxy resin system used to secure fittings 89 to channels 88.

Figure 9:
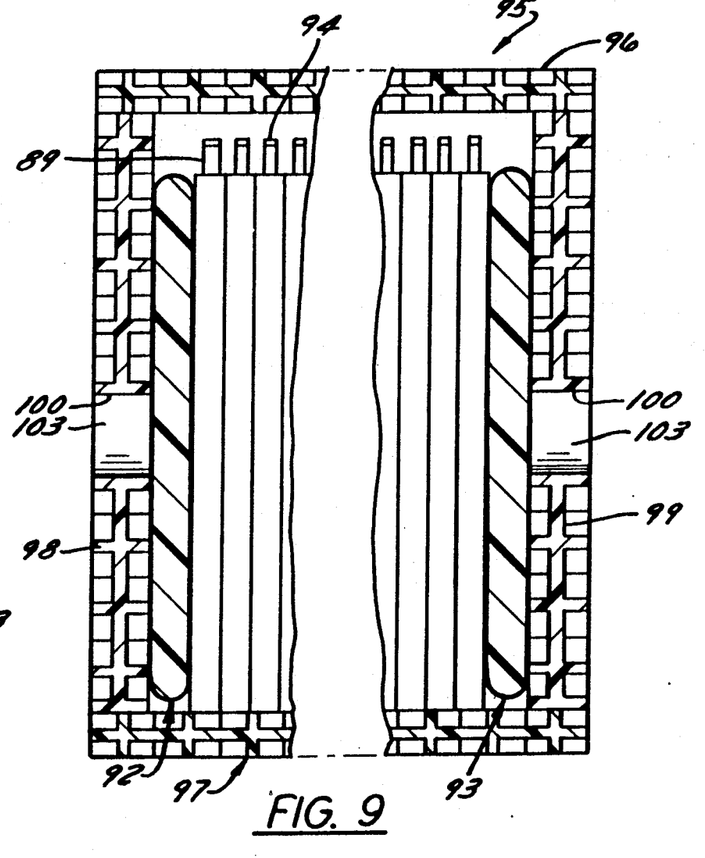
FIG. 9 is a schematic illustration showing a battery prepared from the stack shown in FIG. 8 and including a battery encasement.

The final FIGURE to be described, i.e. FIG. 9, shows the stack and termination components described and shown in FIG. 8 contained within a battery enclosure 95 including (in this view) top and bottom walls 96 and 97 respectively, and left and right end walls 98 and 99 respectively. Any number of materials may be used for constructing the enclosure 95, such as those previously used in the battery art. These could take the form of flexible resin films or molded rigid plastics, the FIGURE showing a rigid polycarbonate honeycomb resin to result in a lighter weight but strong enclosure.

An aperture 100 is found in end walls 98 and 99 in the illustrated embodiment to receive an intermodular connector, such as a piece of copper 103. Obviously, other connector designs and locations could be employed depending on the end use of the finished batter. The arrangement and location of the connector would depend, inter alia, on whether the battery would be used by itself or whether it would be used in series or parallel connection with other encased batteries.

While the physical components of the battery have now been described, several comments should be made about the preferred method of adding electrolyte and forming the battery. These steps are not illustrated in detail as they are not significantly unlike those used to fill and form other recombinant lead-acid batteries, except that some modifications are required due to the structural requirements presented by the preferred embodiment. Electrolyte addition and formation occurs prior to encasement and the addition of vents 94 by coupling an electrolyte fill tube to each of the fittings 89 (see FIG. 8), preferably after the electrode stack and the electrolyte have been chilled to about −20° F. The stack 75 is put under compression between rigid end blocks, not shown (for example to compress the separator sheets in each cell by about 25%). Conductors are then attached to each of terminations 92 and 93, with formation taking place during repetitive filling and removal of the electrolyte using vacuum forming techniques which, in and of themselves, have been known to the art for some time. This procedure ensures charging of the battery to the desired potential, and removal of gases of formation. Upon completion of formation after as long as 48 hours, some electrolyte is removed so that substantially all remaining electrolyte is held within the separator sheets.

While a single preferred embodiment has been described, the present invention is not to be limited thereby but is to be limited solely by the scope of the claims which follow.

What is claimed is:

1. A quasi-bipolar battery element comprising:
   a non-conductive substrate having first and second sides and at least one elongate slot therein;
   a conductive, battery paste support passing through the substrate and folded so that first and second portions of the support generally abut the first and second sides of the substrate respectively; and
   battery paste on the first and second portion of the support.

2. The element of claim 1 wherein the substrate is a generally planar, resin substrate.

3. The element of claim 2 wherein the substrate is held in a surrounding frame.

4. The element of claim 3 wherein the frame and substrate are prepared from thermoplastic resins and the substrate is heat sealed to the frame 5. The element of claim 4 wherein the frame has opposed faces defining a border about the substrate and wherein a thermoplastic resin bead is provided on one face of the frame and extending around the substrate.

6. The element of claim 1 having at least three parallel and spaced apart slots and four supports.

7. The element of claim 1 wherein each slot is sealed.

8. The element of claim 7 wherein the seal is provided by a strip of a thermoplastic resin heat sealed to the substrate.

9. The element of claim 1 wherein the support is a metal grid.

10. The element of claim 9 wherein the support is an expanded lead grid having at least 50% open area 11. The element of claim 10 wherein the grid is coined to a first thickness.

12. The element of claim 11 wherein the thickness of the first and second portions are different.

13. The element of claim 3 wherein a channel is provided in each frame extending from the substrate to the outer periphery of the frame.

14. A battery element stack comprising a plurality of battery elements sealed to one another, each element comprising:

a non-conductive substrate having first and second sides and at least one elongate slot therein;

a conductive, battery paste support passing through the substrate and folded so that first and second portions of the support generally abut the first and second sides of the substrate respectively;

battery paste on the first and second portion of the support; and separator sheets between confronting pasted areas of adjoining elements.

15. The battery element stack as set forth in claim 14 wherein the substrate is a generally planar, resin substrate held in a surrounding frame.

16. The stack of claim 15 wherein the frame is a thermoplastic resin frame having a border and a bead on one face thereof, the stack being sealed by fusing the bead of one element to the other face of another element.

17. The stack of claim 14 wherein each element has at least three parallel and spaced apart slots and four supports, the slots being sealed to prevent gas or liquid from flowing therethrough.

18. The stack of claim 14 wherein the support is an expanded lead grid coined to a first thickness on its first portion and to a second thickness on its second portion.

19. The stack of claim 15 wherein a channel is formed in each frame.

20. The stack of claim 19 further including an electrolyte fill fitting in each channel.

21. A battery comprising the stack of claim 14, termination electrodes and vents.

22. The battery of claim 21 further comprising an encasement.

* * * * *